US012732086B2

(12) United States Patent
Lee et al.

(10) Patent No.: US 12,732,086 B2
(45) Date of Patent: Sep. 8, 2026

(54) FREQUENCY MODULATION CIRCUIT FOR POWER SUPPLY UNIT

(71) Applicant: LITE-ON TECHNOLOGY CORPORATION, Taipei (TW)

(72) Inventors: Kun-Hung Lee, Taipei (TW); Yun-Chieh Hsu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 206 days.

(21) Appl. No.: 18/648,512

(22) Filed: Apr. 29, 2024

(65) Prior Publication Data

US 2025/0038640 A1 Jan. 30, 2025

(30) Foreign Application Priority Data

Jul. 25, 2023 (TW) ................................ 112127748

(51) Int. Cl.
*H02M 1/00* (2007.01)
*H02M 1/42* (2007.01)

(52) U.S. Cl.
CPC ....... *H02M 1/0025* (2021.05); *H02M 1/0009* (2021.05); *H02M 1/4208* (2013.01)

(58) Field of Classification Search
CPC ............. H02M 1/0032; H02M 1/4208; H02M 1/4225; H02M 1/42–4291
See application file for complete search history.

(56) References Cited

U.S. PATENT DOCUMENTS 7,012,413 B1 * 3/2006 Ye .......................... H02M 1/42 323/299
2012/0249091 A1 * 10/2012 Chen .................. H02M 1/4225 323/207

FOREIGN PATENT DOCUMENTS

TW 201114160 A 4/2011
TW 201240301 A 10/2012

OTHER PUBLICATIONS

Taiwan Intellectual Property Office "Office Action" issued on Jun. 21, 2024, Taiwan.

* cited by examiner

*Primary Examiner* — Jeffrey A Gblende
*Assistant Examiner* — Ularislao Cordova
(74) *Attorney, Agent, or Firm* — WPAT, PC

(57) ABSTRACT

A frequency modulation circuit of a power supply includes a frequency adjustment circuit and a switch control signal generation circuit coupled to the frequency adjustment circuit. The switch control signal generation circuit generates a plurality of switch control signals to the frequency adjustment circuit based on a peak load request, in order to control a plurality of switches in the frequency adjustment circuit. In response to these switch control signals, an internal equivalent resistance and an internal equivalent capacitance of the frequency adjustment circuit are altered. By adjusting the internal equivalent resistance and internal equivalent capacitance of the frequency adjustment circuit, a switch frequency of a PFC circuit power stage of the power supply is controlled by the frequency adjustment circuit, in order to meet the peak load request.

13 Claims, 8 Drawing Sheets

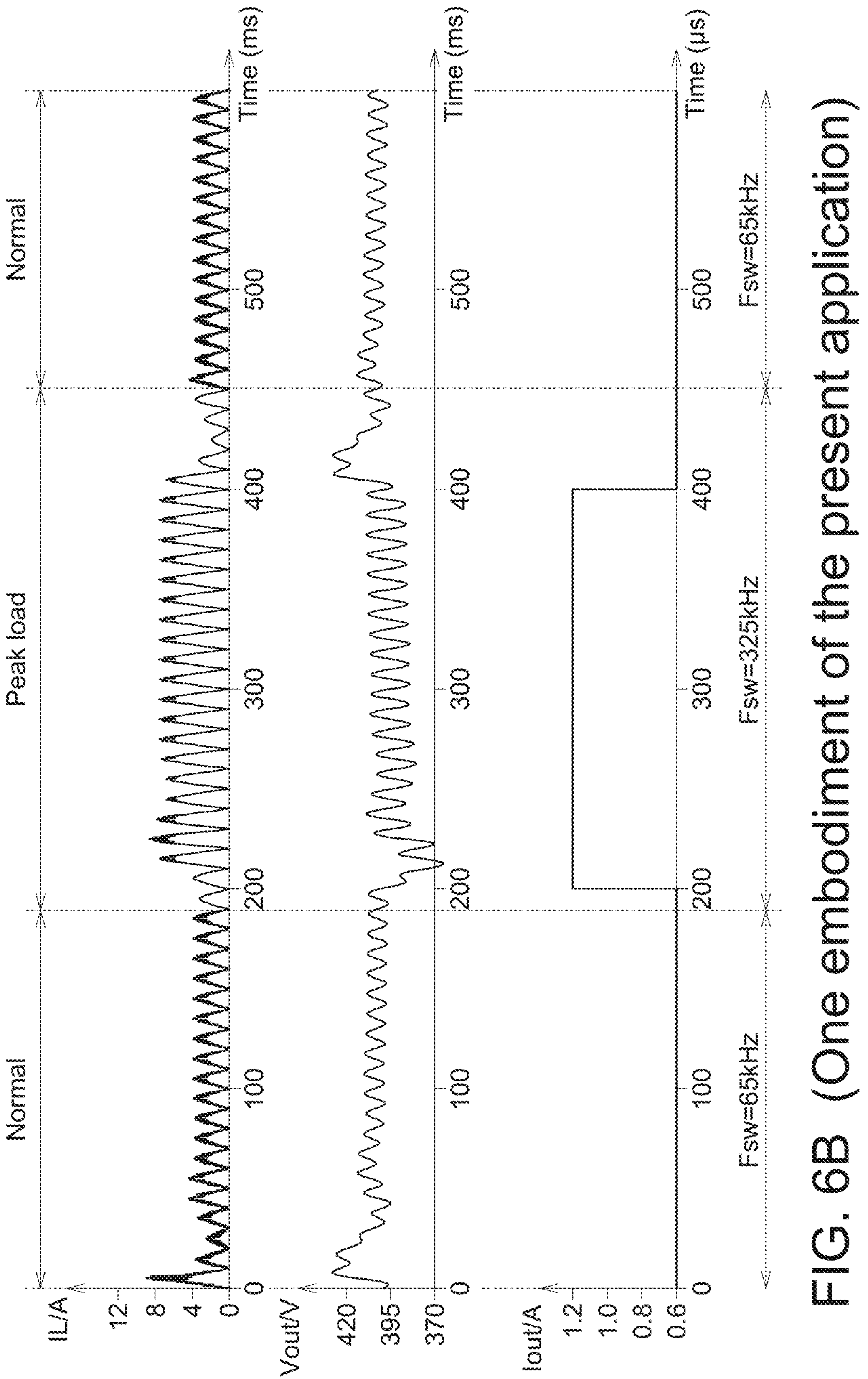
FIG. 6B (One embodiment of the present application)

FREQUENCY MODULATION CIRCUIT FOR POWER SUPPLY UNIT

This application claims the benefit of Taiwan application Serial No. 112127748, filed Jul. 25, 2023, the subject matter of which is incorporated herein by reference.

BACKGROUND OF THE INVENTION

Field of the Invention

The invention relates in general to a frequency modulation circuit of a power supply.

Description of the Related Art

A power supply provides a power source to many elements of an electronic system. The electronic system includes one or more high power consumption units, such as central processing unit (CPU) or graphics processing unit (GPU). When the central processing unit (CPU) or the graphics processing unit (GPU) needs a large amount of power, a peak load request will be raised. Currently there are several resolutions which meet the peak load request and at the same time avoid the internal inductor of the power factor correction (PFC) circuit of a power supply being saturated during the peak load. The first solution is to increase the winding turns of the PFC inductor; however, the first solution increases the size of the choke. The second solution is to increase the cross-sectional area of the choke; the second solution also increases the size of the choke. The third solution is to increase the air gap of the choke so as to decrease the inductance value; however, the third solution decreases PFC efficiency PFC and is unfavorable to low power consumption. The fourth solution is to change the material of the choke from an iron material to a soft saturation material; however, the fourth solution decreases PFC efficiency and creates an acoustic impact.

Therefore, it has become a prominent task for the industries to provide a frequency modulation circuit of a power supply for reducing the shortcomings encountered in the prior art and providing several advantages.

SUMMARY OF THE INVENTION

According to one embodiment of the present invention, a frequency modulation circuit of a power supply is provided. The frequency modulation circuit includes a frequency adjustment circuit and a switch control signal generation circuit coupled to the frequency adjustment circuit. According to a peak load request, the switch control signal generation circuit generates a plurality of switch control signals to the frequency adjustment circuit so as to control a plurality of switches of the frequency adjustment circuit. In response to these switch control signals, an internal equivalent resistance and an internal equivalent capacitance of the frequency adjustment circuit are altered. In response to the alteration of the internal equivalent resistance and the internal equivalent capacitance of the frequency adjustment circuit, the frequency adjustment circuit controls a switch frequency of a power factor correction (PFC) circuit power stage of the power supply so as to meet the peak load request.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 6A and FIG. 6B are waveform diagrams of inductor current IL, output voltage Vout and output current Iou according to the prior art and an embodiment of the present application respectively.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
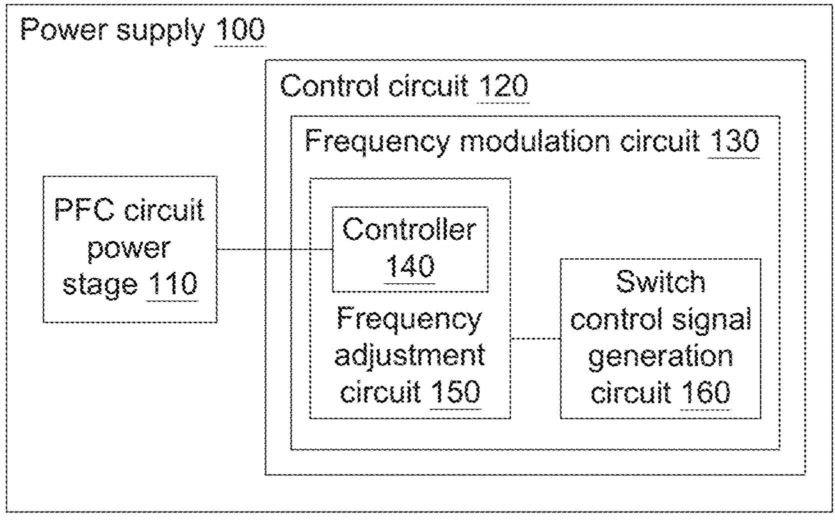
FIG. 1 is a functional block diagram of a power supply according to an embodiment of the present application.

FIG. 1 is a functional block diagram of a power supply according to an embodiment of the present application. As indicated in FIG. 1, the power supply 100 according to an embodiment of the present application includes a power factor correction (PFC) circuit power stage 110 and a control circuit 120. The PFC circuit power stage 110 is coupled to the control circuit 120. In the present application, the architecture of the PFC circuit power stage 110 is not subjected to specific restrictions. Besides, the PFC circuit power stage 110 includes an internal inductor (not illustrated).

The control circuit 120 includes a frequency modulation circuit 130 and other elements (not illustrated). The frequency modulation circuit 130 includes a frequency adjustment circuit 150 and a switch control signal generation circuit 160. The frequency adjustment circuit 150 includes a controller 140 and other elements (not illustrated). The frequency adjustment circuit 150 is coupled to the switch control signal generation circuit 160.

The switch control signal generation circuit 160 generates a switch control signal according to a peak load request so as to control the internal switch (not illustrated) of the frequency adjustment circuit 150. When the internal switch of the frequency adjustment circuit 150 is controlled, an internal equivalent resistance and an internal equivalent capacitance of the frequency adjustment circuit 150 will be altered. In response to the alteration of the internal equivalent resistance and the internal equivalent capacitance of the frequency adjustment circuit 150, the controller 140 can control the switch frequency of the PFC circuit power stage 110 so as to meet the peak load request. Here, the peak load request at least includes a surge load signal from a system or a load, or an output current greater than a threshold (such as the output current Iout as indicated in FIG. 2 to FIG. 4A and FIG. 4B).

The switch control signal generation circuit 160 can have multiple implementations. Detailed descriptions of the implementations are disclosed below.

First Embodiment

Figure 2:
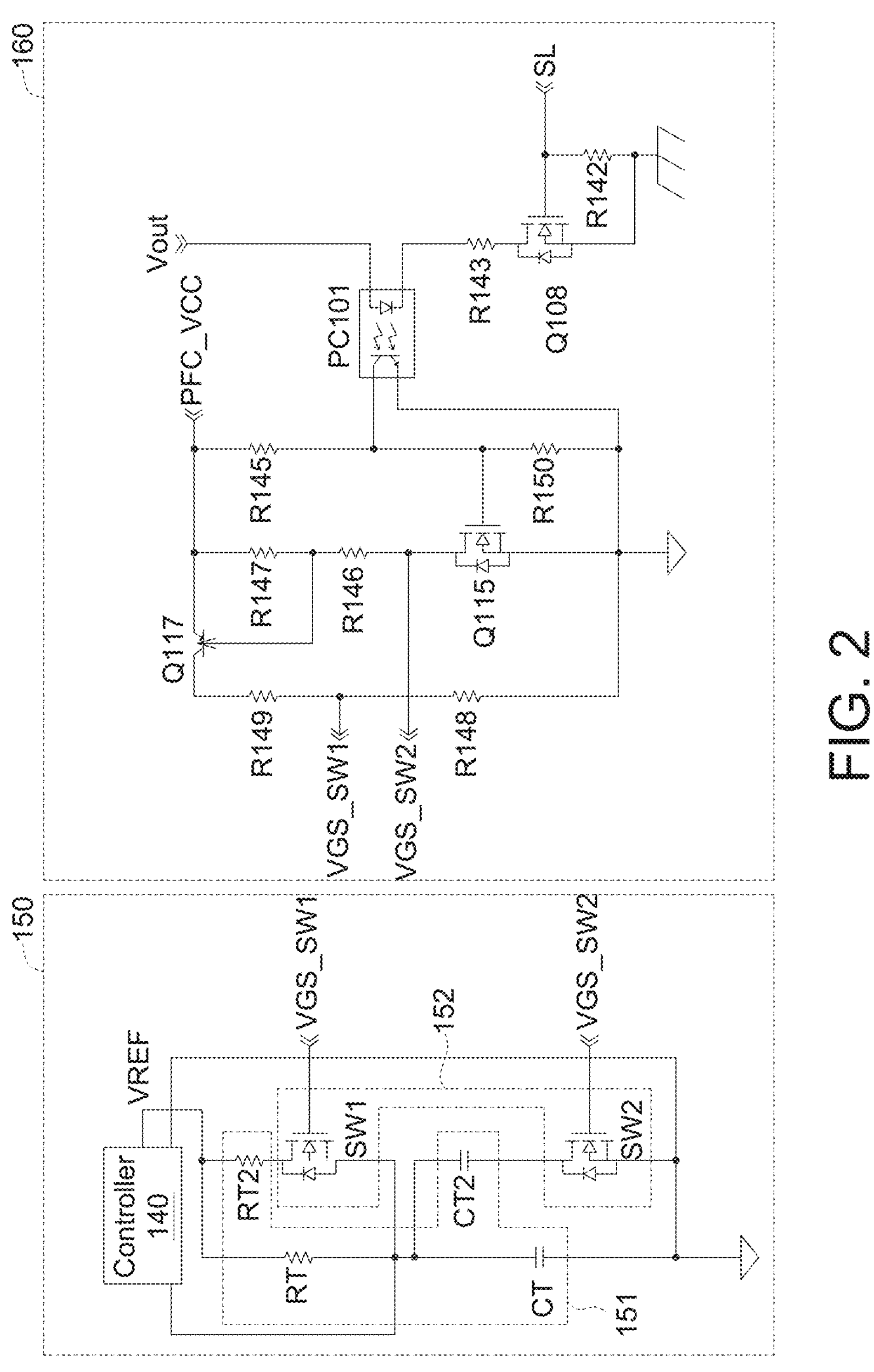
FIG. 2 is a circuit architecture diagram of a frequency adjustment circuit and a switch control signal generation circuit according to a first embodiment of the present application.

FIG. 2 is a circuit architecture diagram of a frequency adjustment circuit 150 and a switch control signal generation circuit 160 according to a first embodiment of the present application. As indicated in FIG. 2, the controller 140 can be realized by a control integrated circuit (IC).

The frequency adjustment circuit 150 includes a controller 140, a resistor-capacitor (RC) circuit 151 and a switch circuit 152. The RC circuit 151 includes resistors RT and RT2 and capacitors CT and CT2. The switch circuit 152 includes switches SW1 and SW2. The controller 140 is coupled to the RC circuit 151 and the switch circuit 152.

The switch SW1 includes a first terminal, a second terminal and a control terminal. The first terminal (such as but not limited to a source terminal) is coupled to the resistor RT and the capacitors CT and CT2. The second terminal (such as but not limited to drain terminal) is coupled to the resistor RT2. The control terminal (such as but not limited to a gate terminal) receives a first switch control signal VGS_SW1 generated by the switch control signal generation circuit 160.

The switch SW2 includes a first terminal, a second terminal, and a control terminal. The first terminal (such as but not limited to a source terminal) is coupled to the ground terminal (GND). The second terminal (such as but not limited to a drain terminal) is coupled to the capacitor CT2. The control terminal (such as but not limited to a gate terminal) receives a second switch control signal VGS_SW2 generated by the switch control signal generation circuit 160.

The resistor RT is coupled between the reference voltage VREF provided by the controller 140 and the first terminal of the switch SW1. The resistor RT2 is coupled between the reference voltage VREF provided by the controller 140 and the second terminal of the switch SW1.

The capacitor CT is coupled between the first terminal of the switch SW1 and the ground terminal. The capacitor CT2 is coupled between the first terminal of the switch SW1 and the second terminal of the switch SW2.

The switch control signal generation circuit 160 includes a switch Q115, a switch Q108, a transistor Q117, an optical coupling diode PC101, and resistors R142~R143 and R145~R150. The resistors R145 and R150 form a voltage divider circuit; and the resistors R148 and R149 form a voltage divider circuit.

The switch Q115 includes a first terminal, a second terminal and a control terminal. The first terminal (such as but not limited to a source terminal) is coupled to the ground terminal. The second terminal (such as but not limited to a drain terminal) is coupled to the resistor R146 to output the second switch control signal VGS_SW2. The control terminal (such as but not limited to a gate terminal) is coupled to the optical coupling diode PC101.

The switch Q108 includes a first terminal, a second terminal and a control terminal. The first terminal (such as but not limited to a source terminal) is coupled to the ground terminal. The second terminal (such as but not limited to a drain terminal) is coupled to the optical coupling diode PC101. The control terminal (such as but not limited to a gate terminal) receives a surge load signal SL sent from a system or a load. When the system or the load needs a high power, the surge load signal SL is at a low level (such as but not limited to 0-0.1V); when the system or the load needs a normal power, the surge load signal SL is at a high level (such as but not limited to 3-5V).

The transistor Q117 includes a first terminal, a second terminal, and a third terminal. The first terminal is coupled to the voltage source PFC_VCC. The second terminal is coupled to the resistors R146 and R147. The third terminal outputs the first switch control signal VGS_SW1 through the resistor R149.

The optical coupling diode PC101 includes a first terminal, a second terminal, a third terminal and a fourth terminal. The first terminal receives a voltage Vout. The second terminal is coupled to the switch Q108 through the resistor R143. The third terminal is coupled to the resistors R145 and R150. The fourth terminal is coupled to the ground terminal.

The resistor R142 is coupled between the surge load signal SL and the ground terminal. The resistor R143 is coupled between the optical coupling diode PC101 and the switch Q108. The resistors R145 and R150 form a voltage divider circuit serially coupled between the voltage source PFC_VCC and the ground terminal. The resistor R146 is coupled between transistor Q117 and the switch Q115. The resistor R147 is coupled between the voltage source PFC_VCC and the resistor R146. The resistors R148 and R149 form a voltage divider circuit serially coupled between transistor Q117 and the ground terminal.

Operations of the first embodiment of the present application are as follows:

The controller 140 and the frequency adjustment circuit 150 are used to switch the switch frequency of the power supply 100; the switch control signal generation circuit 160 detects the surge load signal SL provided by the system or the load.

The operation principles of the controller 140 and the frequency adjustment circuit 150 have two scenarios: scenario 1 (when a surge load is established, the switch frequency is increased), and scenario 2 (when the surge load is not established, the original switch frequency is maintained). Detailed explanations of the two scenarios are disclosed below.

When the system or the load raises a surge load request, the surge load signal SL is at a low level; when the system or the load does not raise any surge load request (that is, when the power requested by the system or the load is a normal power), the surge load signal SL is at a high level.

Under scenario 1 (when a surge load is established, the switch frequency is increased), in response to the surge load signal SL being at a low level, the switch control signal generation circuit 160 generates a first switch control signal VGS_SW1 at a high level and a second switch control signal VGS_SW2 at a low level. When the first switch control signal VGS_SW1 is at a high level, the first switch SW1 is turned on, so that the resistors RT and RT2 are connected in parallel, and the equivalent resistor is RT connected in parallel with RT2 (that is, RT//RT2). When the second switch control signal VGS_SW2 is at a low level, the second switch SW2 is turned off, and the equivalent capacitor is CT.

An example is exemplified below. However, it should be understood that the exemplified data are for exemplary purpose, not for limiting the present application. RT=27 KΩ; RT2=15.8 KΩ; CT=470 pF; CT2=560 pF. VREF=7.52V.

Scenario 1: equivalent resistance $R_{eq}$=RT//RT2=9.97 KΩ; equivalent capacitance $C_{eq}$=CT=470 pF.

$$t_{RAMP} = 9.97K^{*}470p^{*}0.5678 = 2.66\ \mu s.\ t_{DEADTIME} = 292^{*}500p = 0.137\ \mu s.$$

Under scenario 1, the switch frequency Fsw_high can be represented as: Fsw_high=1/$t_{RAMP}$=1/(0.5678*(RT//RT2)*CT)=1/(2.66 μs+0.137 μs)=357.4 kHz.

Wherein, $t_{RAMP}$ represents the charging time for which the capacitor CT is charged with a reference voltage VREF through the resistor RT until the cross voltage of the capacitor CT reached a set value (such as but not limited to about 4V). When the cross voltage of the capacitor CT reaches the set value, the capacitor CT is discharged; $t_{DEADTIME}$ represents the discharging time for which the cross voltage of the capacitor CT is discharged to another set value (such as but not limited to about 1.5V). Frequency setting can be achieved by charging/discharging the capacitor CT within a fixed voltage range. Normally, the discharging time $t_{DEADTIME}$ is very short, therefore the frequency can approximate 1/$t_{RAMP}$.

The operating frequency can be changed by adjusting the values of the resistor RT and the capacitor CT. That is, by changing the resistance value of the resistor RT and/or the capacitance value of the capacitor CT, the charging/discharging time of the capacitor CT can be adjusted, and frequency adjustment can be achieved.

Under scenario 2 (when the surge load is not established, the original switch frequency is maintained), in response to the surge load signal SL being at a high level, the switch control signal generation circuit 160 generates a first switch control signal VGS_SW1 at a low level and a second switch control signal VGS_SW2 at a high level.

When the first switch control signal VGS_SW1 is at a low level, the first switch SW1 is turned off, and the equivalent resistance is equivalent to the resistance of the resistor RT. When the second switch control signal VGS_SW2 is at a high level, the second switch SW2 is turned on, and the equivalent capacitance is equivalent to CT+CT2.

$$t_{RAMP} = 27K^{*}1000p^{*}0.5678 = 15.33\ \mu s.\ t_{DEADTIME} = 292^{*}1000p = 0.292\ \mu s.$$

Under scenario 2, the switch frequency Fsw_normal can be represented as: Fsw_normal=1/$t_{RAMP}$=1/(0.5678*RT*(CT+CT2))=1/(15.33 μs+0.292 μs)=64 KHz.

Similarly, the operation principles of the switch control signal generation circuit 160 have two scenarios: scenario 1 (when a surge load is established, the switch frequency is increased), and scenario 2 (when the surge load is not established, the original switch frequency is maintained). Detailed explanations of the two scenarios are disclosed below.

Under scenario 1 (when a surge load is established, the switch frequency is increased), in response to the surge load signal SL being at a low level, the switch Q108 is turned off, and the optical coupling diode PC101 is also turned off. After the voltage of the voltage source PFC_Vcc is divided by the resistors R145 and R150, a divided voltage is generated then inputted to the control terminal of the switch Q115 to turn on the switch Q115, so that the second switch control signal VGS_SW2 is at a low level. Since the switch Q115 is turned on, transistor Q117 will be turned on due to the bias voltage of the resistors R146 and R147. Through the transistor Q117 that has been turned on, the voltage of the voltage source PFC_Vcc is divided by the resistors R148 and R149 and a first switch control signal VGS_SW1 at a high level is generated.

Under scenario 2 (when the surge load is not established, the original switch frequency is maintained), in response to the surge load signal SL being at a high level, the switch Q108 is turned on and the optical coupling diode PC101 is also turned on. Since the optical coupling diode PC101 is turned on and the switch Q115 is turned off, the second switch control signal VGS_SW2 is at a high level. Since the switch Q115 is turned off and no bias voltage is generated, the transistor Q117 is turned off, and the first switch control signal VGS_SW1 is at a low level.

Through the above operations, in the first embodiment of the present application, when a surge load is established, the switch frequency is increased (such as but not limited to 5 times at least), so that the power supply can provide an even higher power to the system or the load; in the absence of a surge load request, the switch frequency can be maintained.

Second Embodiment

Figure 3:
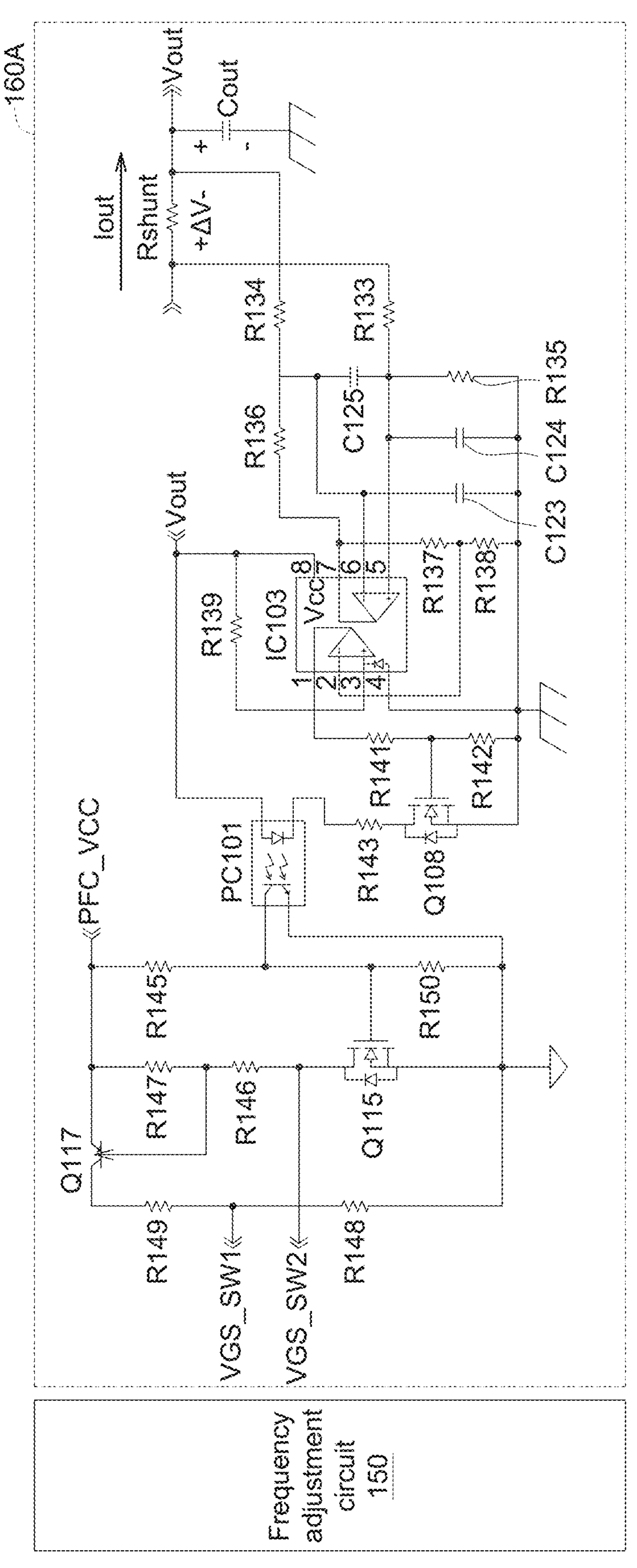
FIG. 3 is a circuit architecture diagram of a frequency adjustment circuit and a switch control signal generation circuit according to a second embodiment of the present application.

FIG. 3 is a circuit architecture diagram of a frequency adjustment circuit 150 and a switch control signal generation circuit 160A according to a second embodiment of the present application. Since the frequency adjustment circuit 150 of FIG. 3 is identical to the frequency adjustment circuit 150 of FIG. 2, its circuit architecture and operation details are omitted here.

Unlike the switch control signal generation circuit 160 of FIG. 2, the switch control signal generation circuit 160A of FIG. 3 detects a current to determine whether a surge load request is raised by the system or the load, then further determines whether to increase the switch frequency.

The switch control signal generation circuit 160A includes a switch Q115, a switch Q108, a transistor Q117, an optical coupling diode PC101, resistors R142~R143 and R145~R150, a controller IC103, resistors R133~R139, R141 and Rshunt, and capacitors C123-C125 and Cout.

The controller IC103 has 8 pins.

The resistor R133 is coupled between the controller IC103 and the resistor Rshunt. The resistor R134 is coupled between the controller IC103 and the resistor Rshunt. The resistor R135 is coupled between the controller IC103 and the ground terminal. The resistor R136 is coupled between the controller IC103 and the resistor R134. The resistors R137 and R138 are serially coupled between the controller IC103 and the ground terminal. The resistor R139 is coupled between the controller IC103 and the output voltage Vout. The resistors R141 and 142 are serially coupled between the controller IC103 and the ground terminal. The capacitor C123 is coupled between the controller IC103 and the ground terminal. The capacitor C124 is coupled between the controller IC103 and the ground terminal. The capacitor C125 is coupled between 2 pins of the controller IC103.

Since the operation principles of the controller 140 and the frequency adjustment circuit 150 of FIG. 3 are identical to the controller 140 and the frequency adjustment circuit 150 of FIG. 2, the similarities are omitted here.

The operation principles of the switch control signal generation circuit 160A have two scenarios: scenario 1 (when a surge load is established, the switch frequency is increased), and scenario 2 (when the surge load is not established, the original switch frequency is maintained). Detailed explanations of the two scenarios are disclosed below.

Under scenario 1 (when a surge load is established, the switch frequency is increased), a voltage difference ΔV is generated when the output current Iout flows through the resistor Rshunt, which is also referred as the sampling resistor. In the second embodiment of the present application, the pins 5, 6, 7 of the controller IC103 form an operation amplifier; the resistors R133, R134, R135, R136 and the operation amplifier (formed of the pins 5, 6, 7 of the controller IC103) form a differential signal amplification circuit. After the voltage difference ΔV generated by the resistor Rshunt is amplified by the differential signal amplification circuit (magnification ratio=(R136/R134)), an amplified voltage "ΔV*(R136/R134)" is generated at the pin 7 of the controller IC103. After the amplified voltage "ΔV*(R136/R134)" is divided by the resistors R137 and R138, a divided voltage is generated then inputted to the pin 2 of the controller IC103. The divided voltage is compared with the reference voltage (such as but not limited to 2.5V) of the pin 3 of the controller IC103. When the divided voltage of the pin 2 of the controller IC103 is greater than the reference voltage of the pin 3 of the controller IC103, the pin 1 of the controller IC103 outputs a low-level signal, so that the switch Q108 is turned off, and the optical coupling diode PC101 is also turned off. After the voltage source PFC_Vcc is divided by the resistors R145 and R150, a divided voltage is generated then inputted to the control terminal of the switch Q115 to turn on the switch Q115, so that the second switch control signal VGS_SW2 is at a low level. Since the switch Q115 is turned on, the transistor Q114 will be turned on due to the bias voltage of the resistors R146 and R147 and become, and the voltage source PFC_Vcc will be divided by the resistors R148 and R149 and generate a first switch control signal VGS_SW1 at a high level.

Under scenario 2 (when the surge load is not established, the original switch frequency is maintained), since the output current Iout is smaller, making the divided voltage of the pin 2 of the controller IC103 be smaller than the reference voltage of the pin 3 of the controller IC103, the pin 1 of the controller IC103 will output a high-level signal. The switch Q108 is turned on, and the optical coupling diode PC101 is also turned on. Since the optical coupling diode PC101 is turned on and the switch Q115 is turned off, the second switch control signal VGS_SW2 is at a high level. Since the switch Q115 is turned off and no bias voltage is generated, the transistor Q117 is turned off and the first switch control signal VGS_SW1 is at a low level.

Through the above operations, in the second embodiment of the present application, when a surge load is established, the switch frequency is increased (such as but not limited to 5 times at least), so that the power supply can provide an even higher power to the system or the load; and, in the absence of a surge load request, the switch frequency can be maintained.

Third Embodiment

Figure 4A:
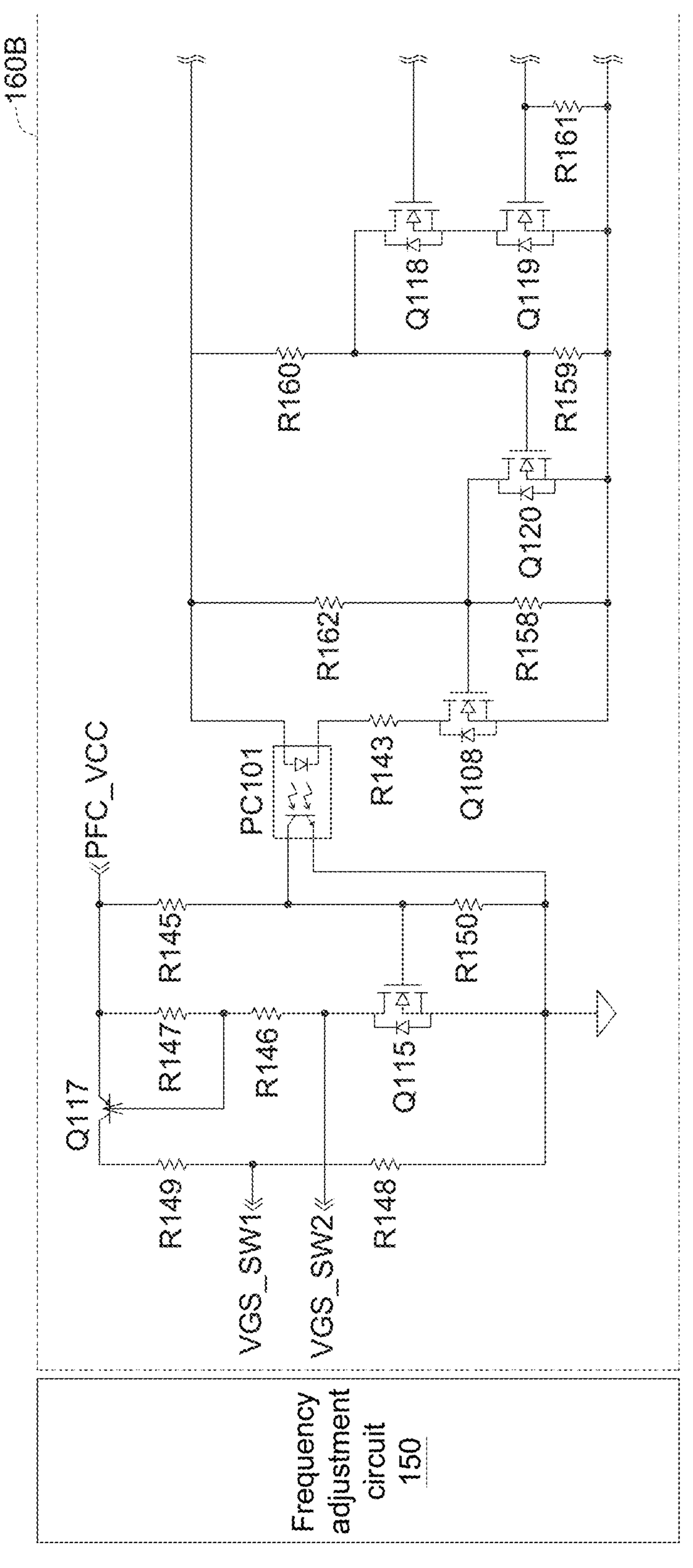
FIG. 4A and FIG. 4B are circuit architecture diagrams of a frequency adjustment circuit and a switch control signal generation circuit according to a third embodiment of the present application.
Figure 4B:
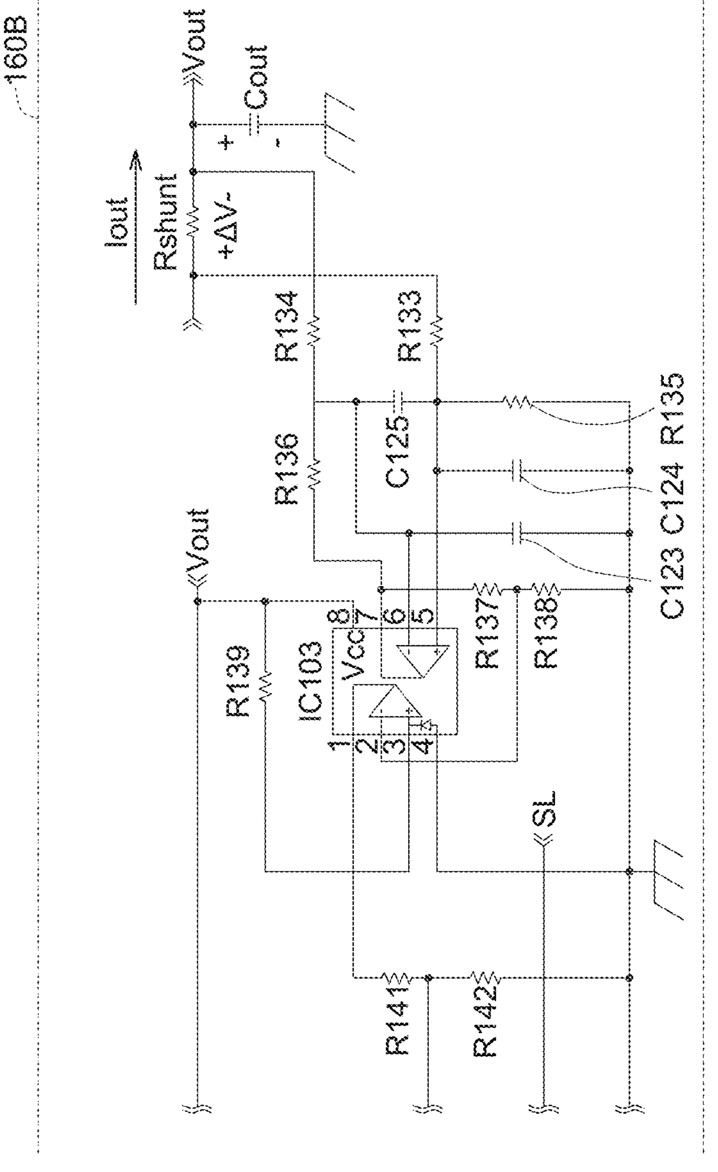

FIG. 4A and FIG. 4B are circuit architecture diagrams of a frequency adjustment circuit 150 and a switch control signal generation circuit 160B according to a third embodiment of the present application. The switch control signal generation circuit 160B of the third embodiment can be regarded as a combination of the switch control signal generation circuit 160 of the first embodiment and the switch control signal generation circuit 160A of the second embodiment. Since the frequency adjustment circuit 150 of FIG. 3 is identical to the frequency adjustment circuit 150 of FIG. 2, its circuit architecture and operation details are omitted here.

Unlike the switch control signal generation circuit of FIG. 2 and FIG. 3, the switch control signal generation circuit 160B of FIG. 4A and FIG. 4B detects an output current Iout, then further determines whether to increase the switch frequency, and/or, the switch control signal generation circuit 160B detects a surge load request sent from the system or the load, then further determines whether to increase the switch frequency.

As indicated in FIG. 4A and FIG. 4B, the switch control signal generation circuit 160B includes a switch Q115, a switch Q108, a transistor Q117, an optical coupling diode PC101, resistors R142~R143 and R145~R150, a controller IC103, resistors R133~R139, R141, Rshunt, capacitors C123-C125, Cout, switches Q118-Q120, and resistors R158~R162.

The switch Q118 includes a first terminal, a second terminal and a control terminal. The first terminal (such as but not limited to a source terminal) is coupled to the switch Q119. The second terminal (such as but not limited to a drain terminal) is coupled to the resistor R160. The control terminal (such as but not limited to a gate terminal) receives a voltage divided by the resistors R141 and R142.

The switch Q119 includes a first terminal, a second terminal, and a control terminal. The first terminal (such as but not limited to a source terminal) is coupled to the ground terminal. The second terminal (such as but not limited to a drain terminal) is coupled to the first terminal of the switch Q119. The control terminal (such as but not limited to a gate terminal) receives a surge load signal SL.

The switch Q120 includes a first terminal, a second terminal, and a control terminal. The first terminal (such as but not limited to a source terminal) is coupled to the ground terminal. The second terminal (such as but not limited to a drain terminal) is coupled to the control terminal of the switch Q108. The control terminal (such as but not limited to a gate terminal) receives a voltage divided by the resistors R159 and R160.

The resistors R158 and R162 are serially coupled between the output voltage Vout and the ground terminal to divide the output voltage Vout; the divided voltage is received by the control terminal of the switch Q108. The resistors R159 and R160 are serially coupled between the output voltage Vout and the ground terminal to divide the output voltage Vout voltage divider; the divided voltage is received by the control terminal of the switch Q120. The resistor R161 is coupled between the control terminal of the switch Q119 and the ground terminal.

The operation principles of the controller 140 and the frequency adjustment circuit 150 have two scenarios: scenario 1 (when a surge load is established, the switch frequency is increased), and scenario 2 (when the surge load is not established, the original switch frequency is maintained). Details are omitted here.

Operations of the switch control signal generation circuit 160B under scenario 1 (when a surge load is established, the switch frequency is increased) and scenario 2 (when the surge load is not established, the original switch frequency is maintained) are disclosed below.

Under scenario 1 (when a surge load is established, the switch frequency is increased), in response to the surge load signal SL being at a low level, the switch Q119 is turned off. Under scenario 2 (when the surge load is not established, the original switch frequency is maintained), in response to the surge load signal SL being at a high level, the switch Q119 is turned on.

As for the detection of the output current Iout, which determines whether the pin 1 of the controller IC103 outputs a high-level signal or a low-level signal, details can be obtained with reference to the second embodiment, and the similarities are not repeated here.

In the third embodiment of the present application, the switches Q118 and Q119 adopt a NAND logic design. When the system or the load sends a surge load signal SL at a low level to the switch Q119, the gate-source voltage of the switch Q119 is at a low level to turn off the switch Q119; when the system or the load sends a surge load signal SL at a high level to the switch Q119, the gate-source voltage of the switch Q119 is at a high level to turn on the switch Q119. When the output current Iout makes the pin 1 of the controller IC103 output a low-level signal, the gate-source voltage of the switch Q118 is at a low level to turn off the switch Q118. When the output current Iout makes the pin 1 of the controller IC103 output a high-level signal, the gate-source voltage of the switch Q118 is at a high level to turn on the switch Q118. When the gate-source voltage of one or both of the switches Q118 and Q119 is at a low level (that is, the system or the load sends a surge load signal SL at a low level or/and, the output current Iout makes the pin 1 of the controller IC103 output a low-level signal), the establishment conditions of a surge load are met. Conversely, when the gate-source voltage of both of these switches Q118 and Q119 is at a high level, the establishment conditions of a surge load are not met.

Scenario 1 (when a surge load is established, the switch frequency is increased):

The establishment conditions: when the gate-source voltage of one or both of the switch Q118 and Q119 is at a low level, the switch Q118 and/or Q119 will be turned off. Therefore, after the output voltage Vout is divided by the resistors R160 and R159, the divided voltage will turn on the switch Q120. Since the switch Q120 is turned on, the gate-source voltage of the switch Q108 is at a low level and turned off, making the optical coupling diode PC101 turned off as well. After the voltage source PFC_VCC is divided by the resistors R145 and R150, the divided voltage will turn on the switch Q115, making the second switch control signal VGS_SW2 at a low level. When the switch Q115 is turned on, the transistor Q114 will be turned on due to the bias voltage of the resistors R146 and R147 and. After the voltage source PFC_VCC is divided by the resistor R149 and R148, a first switch control signal VGS_SW1 at a high level is generated.

Scenario 2 (when the surge load is not established, the original switch frequency is maintained):

The establishment conditions: when the gate-source voltage of both of these switches Q118 and Q119 is at a high level, the switches Q118 and Q119 will be turned on at the same time, making the gate-source voltage of the switch Q120 at a low level and the switch Q120 become turned off. After the output voltage Vout is divided by the resistors R162 and R158, the switch Q108 is turned on and the optical coupling diode PC101 is also turned on. When the optical coupling diode PC101 is turned on, the gate-source voltage of the switch Q115 is at a low level and the switch Q115 is turned off, making the second switch control signal VGS_SW2 at a high level. Since the switch Q115 is turned off, no bias voltage is generated, the transistor Q114 is turned off, making the first switch control signal VGS_SW1 at a low level.

Through the above operations, in the third embodiment of the present application, when a surge load is established, the switch frequency is increased (such as but not limited to 5 times at least), so that the power supply can provide an even higher power to the system or the load; and, in the absence of a surge load request, the switch frequency can be maintained.

Figure 5:
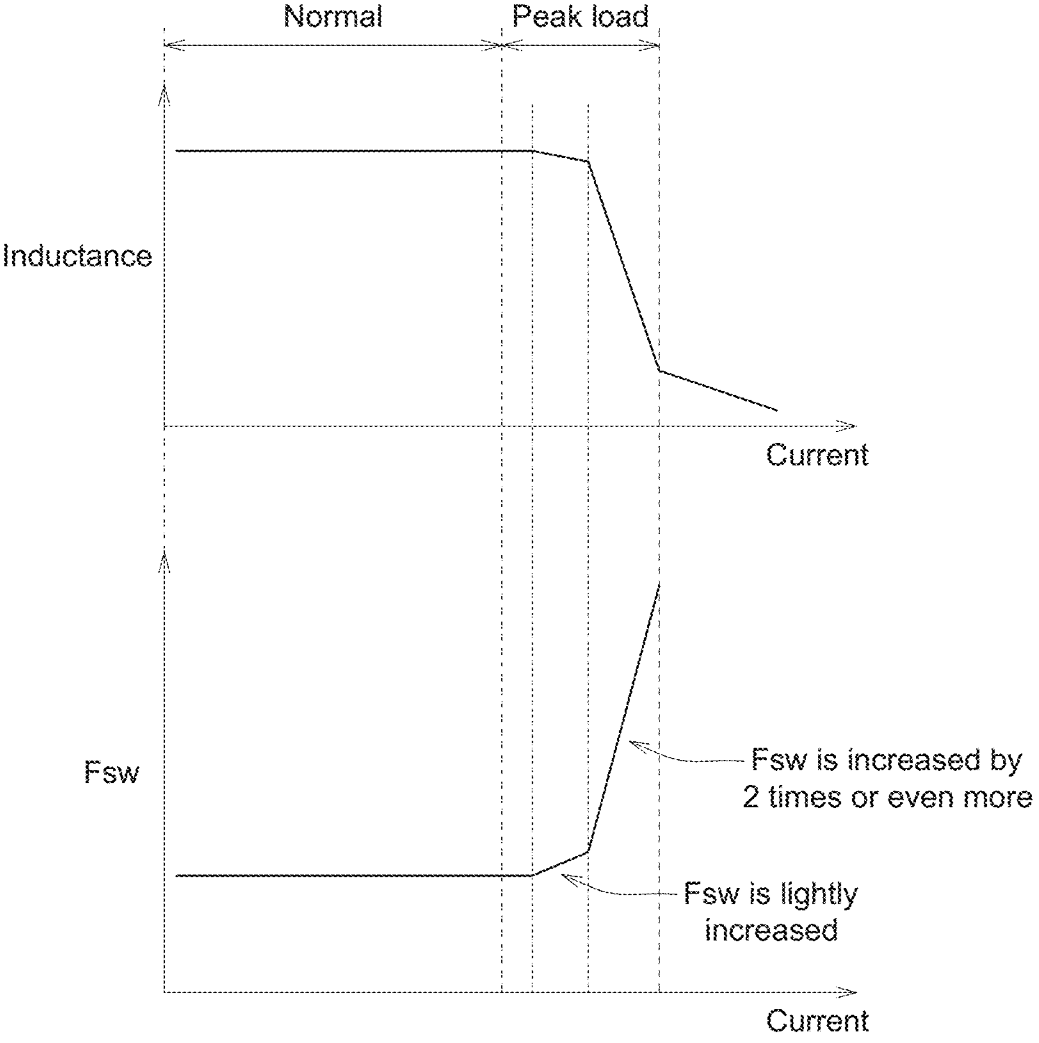
FIG. 5 is a waveform diagram of inductance value and switch frequency according to an embodiment of the present application.

FIG. 5 is a waveform diagram of inductance value and switch frequency according to an embodiment of the present application. As indicated in FIG. 5, when the power supply enters a peak load stage, if the switch frequency Fsw is slightly increased, the internal inductance value of the PFC circuit of the power supply will drop slightly as well. However, if the switch frequency Fsw is increased by two times or even more, the internal inductance value of the PFC circuit of the power supply will decrease greatly to avoid the occurrence of inductor saturation.

Figure 6A:
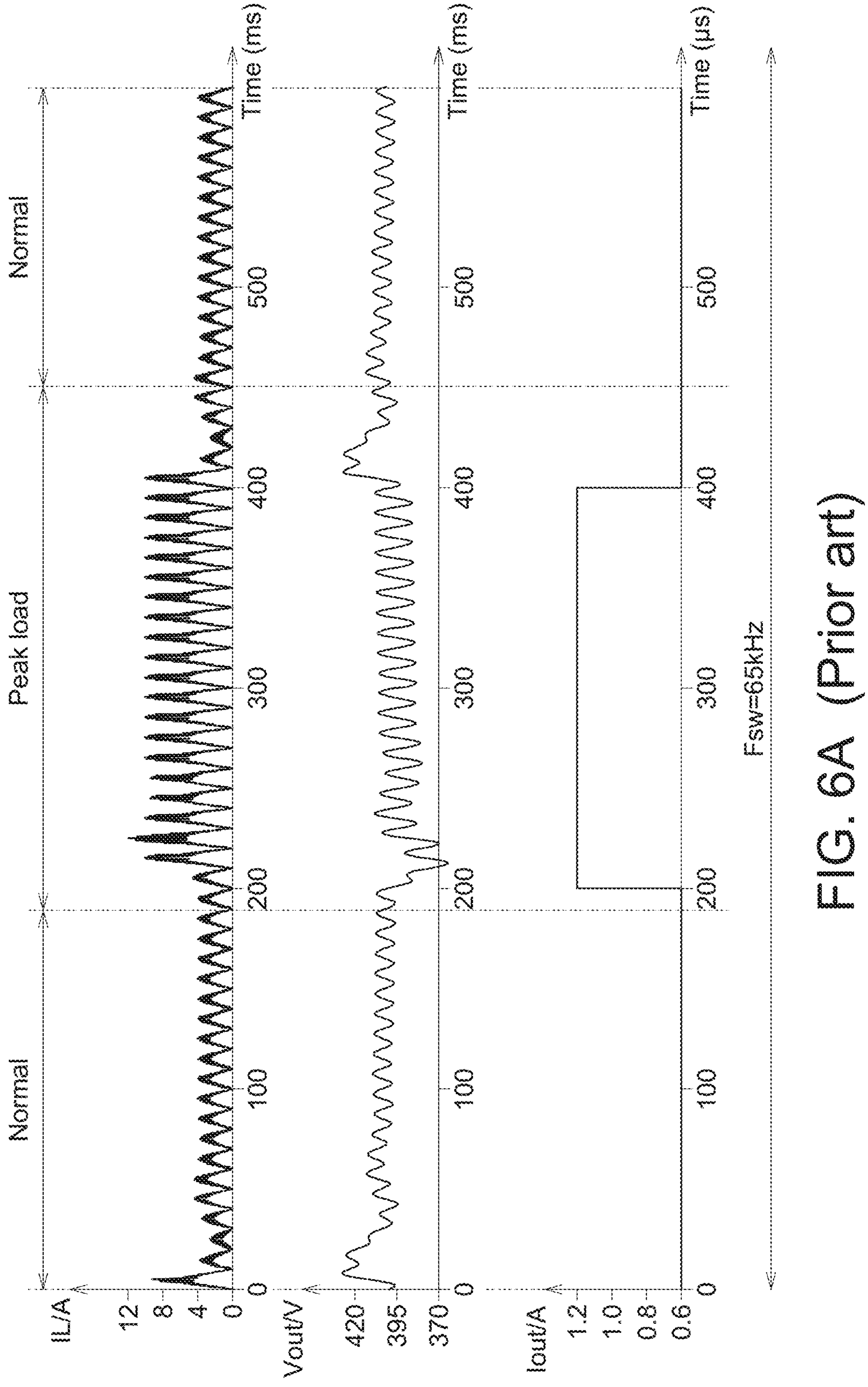

FIG. 6A and FIG. 6B are waveform diagrams of inductor current IL, output voltage Vout and output current Iou according to the prior art and an embodiment of the present application respectively. As indicated in FIG. 6A, in the prior art, when the power supply enters a peak load stage, since the switch frequency Fsw is not increased, the inductor has a high peak current and enters a saturation state. As indicated in FIG. 6B, in an embodiment of the present application, when the power supply enters a peak load stage, the switch frequency is increased Fsw (from 65 kHz to 325 kHz), the inductor has a lower peak current and is less likely to enter a saturation state.

As disclosed above, in the above embodiments of the present application, when the system or the load raises a peak load request, the switch frequency of the power factor correction circuit of the power supply is increased, the peak current of the internal inductor of the PFC circuit power stage of the power supply is decreased, so that the internal inductor is less likely to enter inductor saturation. Therefore, according to an embodiment of the present application, since there is no need to increase the winding turns of the PFC inductor or the cross-sectional area of the choke, the supply efficiency of the power source of the power supply will not be affected.

While the invention has been described by way of example and in terms of the preferred embodiment(s), it is to be understood that the invention is not limited thereto. According to the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A frequency modulation circuit of a power supply, the frequency modulation circuit comprising:

a frequency adjustment circuit comprising: a first controller; a resistor-capacitor circuit coupled to the first controller and comprising a plurality of resistors and a plurality of capacitors;

and a switch circuit coupled to the first controller and configured to selectively control electrical connections of the plurality of resistors and the plurality of capacitors wherein the switch circuit comprises a plurality of switches; and a switch control signal generation circuit coupled to the frequency adjustment circuit, wherein according to a peak load request, the switch control signal generation circuit generates a plurality of switch control signals to control the switch circuit, in response to the plurality of switch control signals, an internal equivalent resistance and an internal equivalent capacitance of the resistor-capacitor circuit of the frequency adjustment circuit are altered;

under a scenario where the peak load request is established, the internal equivalent resistance is set to a first equivalent resistance value and the internal equivalent capacitance is set to a first equivalent capacitance value, and the first controller controls a switch frequency of a power factor correction (PFC) circuit power stage of the power supply to operate at a first switch frequency; and under a scenario where the peak load request is not established, the internal equivalent resistance is set to a second equivalent resistance value and the internal equivalent capacitance is set to a second equivalent capacitance value, and the first controller controls the switch frequency of the PFC circuit power stage to operate at a second switch frequency, wherein the first equivalent resistance value is lower than the second equivalent resistance value, the first equivalent capacitance value is lower than the second equivalent capacitance value, and the first switch frequency is higher than the second switch frequency.

2. The frequency modulation circuit according to claim 1, wherein, the peak load request at least comprises: a surge load signal sent from a system or a load, and/or an output current greater than a threshold.

3. The frequency modulation circuit according to claim 1, wherein, when the system or the load raises the peak load request, a surge load signal is at a first level; and when the system or the load does not raise the peak load request, the surge load signal is at a second level.

4. The frequency modulation circuit according to claim 1, wherein, under the scenario where the peak load request is established:

in response to a surge load signal at a first level, the switch control signal generation circuit generates a first switch control signal at a second level and a second switch control signal at a first level;

when the first switch control signal is at the second level and the second switch control signal is at the first level, the switch circuit controls the internal equivalent resistance of the resistors of the resistor-capacitor circuit to be equivalent to the first equivalent resistance value, and the switch circuit controls the internal equivalent capacitance of the capacitors of the resistor-capacitor circuit to be equivalent to the first equivalent capacitance value; and under the scenario where the peak load request is not established:

in response to the surge load signal at a second level, the switch control signal generation circuit generates the first switch control signal at the first level and the second switch control signal at the second level; and when the first switch control signal is at the first level and the second switch control signal is at the second level, the switch circuit controls the internal equivalent resistance of the resistors of the resistor-capacitor circuit to be equivalent to the second equivalent resistance value, and the switch circuit controls the internal equivalent capacitance of the capacitors of the resistor-capacitor circuit to be equivalent to the second equivalent capacitance value.

5. The frequency modulation circuit according to claim 4, wherein, the switch control signal generation circuit comprises:

a first switch used to receive the surge load signal;

an optical coupling diode coupled to the first switch;

a second switch coupled to the optical coupling diode to generate the second switch control signal; and a transistor coupled to the second switch to generate the first switch control signal.

6. The frequency modulation circuit according to claim 5, wherein, under the scenario where the peak load request is established:

in response to the surge load signal at the first level, the first switch is turned off, the optical coupling diode is turned off, the second switch is turned on to generate the second switch control signal at the first level, and the transistor is turned on to generate the first switch control signal at the second level.

7. The frequency modulation circuit according to claim 5, wherein, under the scenario where the the peak load request is not established:

in response to the surge load signal at the second level, the first switch is turned on, the optical coupling diode is turned on, the second switch is turned off to generate the second switch control signal at the second level, and the transistor is turned off to generate the first switch control signal at the first level.

8. The frequency modulation circuit according to claim 4, wherein, the switch control signal generation circuit comprises:

a first switch;

an optical coupling diode coupled to the first switch;

a second switch coupled to the optical coupling diode to generate the second switch control signal;

a transistor coupled to the second switch to generate the first switch control signal;

a sampling resistor used to sample an output current; and a second controller coupled to the sampling resistor and the first switch.

9. The frequency modulation circuit according to claim 8, wherein, under the scenario where the peak load request is established:

a voltage difference is generated when the output current flows through the sampling resistor, according to the voltage difference and a reference voltage, the second controller outputs an output signal at a first level, in response to the output signal of second controller at the first level, the first switch is turned off, the optical coupling diode is turned off, the second switch is turned on to generate the second switch control signal at the first level, and the transistor is turned on to generate the first switch control signal at the second level.

10. The frequency modulation circuit according to claim 8, wherein, under the scenario where the peak load request is not established:

a voltage difference is generated when the output current flows through the sampling resistor, according to the voltage difference and a reference voltage, the second controller outputs the output signal at a second level, in response to the output signal of the second controller at the second level, the first switch is turned on, the optical coupling diode is also turned on, the second switch is turned off to generate the second switch control signal at the second level, and the transistor is turned off to generate the first switch control signal at the first level.

11. The frequency modulation circuit according to claim 4, wherein, the switch control signal generation circuit comprises:

a first switch;

an optical coupling diode coupled to the first switch;

a second switch coupled to the optical coupling diode to generate the second switch control signal;

a transistor coupled to the second switch to generate the first switch control signal;

a sampling resistor used to sample an output current;

a second controller coupled to the sampling resistor and the first switch;

a third switch coupled to the second controller;

a fourth switch used to receive the surge load signal; and a fifth switch coupled to the first switch, the third switch and the fourth switch.

12. The frequency modulation circuit according to claim 11, wherein, under the scenario where the peak load request is established:

when the surge load signal is at the first level, the fourth switch is turned off, and/or, a voltage difference is generated when the output current flows through the sampling resistor;

according to the voltage difference and a reference voltage, the third switch is turned off when the second controller outputs an output signal at a first level;

in response to the situation where the third switch and/or the fourth switch are turned off, the fifth switch is turned on, so that the first switch is turned off, the optical coupling diode is also turned off, the second switch is turned on to generate the second switch control signal at the first level, and the transistor is turned on to generate the first switch control signal at the second level.

13. The frequency modulation circuit according to claim 11, wherein, under the scenario where the peak load request is not established:

when the surge load signal is at the second level, the fourth switch is turned on;

when the second controller outputs a second level output signal, the third switch is turned on;

in response to the situation where the third switch and the fourth switch both are turned on, the fifth switch is turned off, so that the first switch is turned on, the optical coupling diode is also turned on, the second switch is turned off to generate the second switch control signal at the second level, and the transistor is turned off to generate the first switch control signal at the first level.

* * * * *